Figure 1:
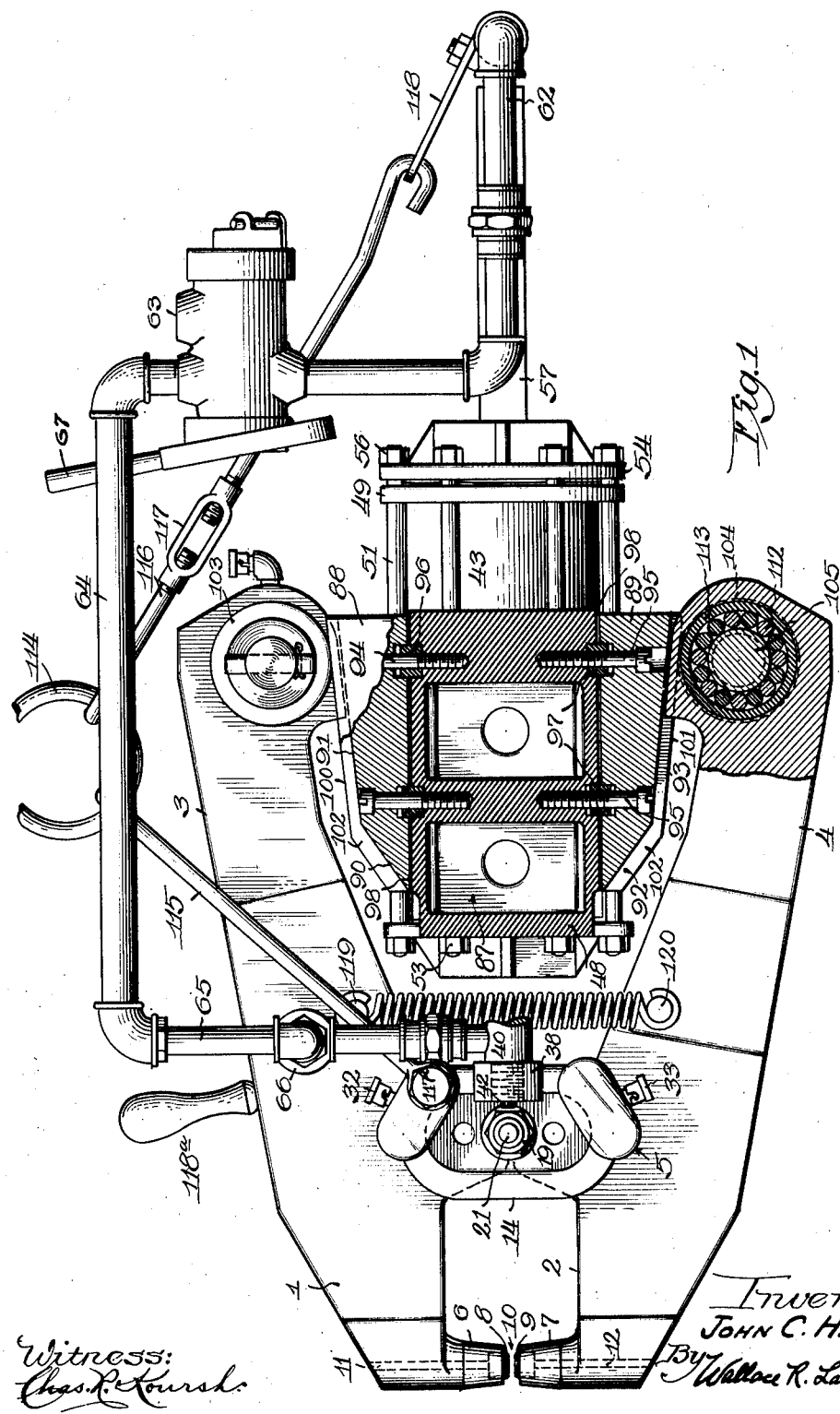

March 26, 1929.  J. C. HANNA  1,707,006
RIVETER
Filed Feb. 9, 1924  4 Sheets-Sheet 1

Witness:
Chas. P. Koursh

Inventor,
JOHN C. HANNA.
By Wallace R. Lane, Atty.

March 26, 1929.  J. C. HANNA  1,707,006

RIVETER

Filed Feb. 9, 1924  4 Sheets-Sheet 2

Fig. 2

Witness:
Chas. R. Koursh.

Inventor,
John C. Hanna.
By Wallace R. Lane, Atty.

March 26, 1929.  J. C. HANNA  1,707,006
RIVETER
Filed Feb. 9, 1924   4 Sheets-Sheet 4
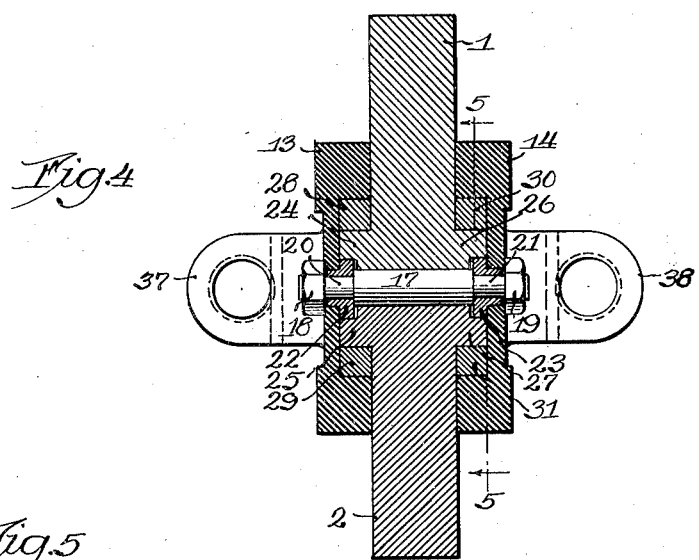
Fig. 4
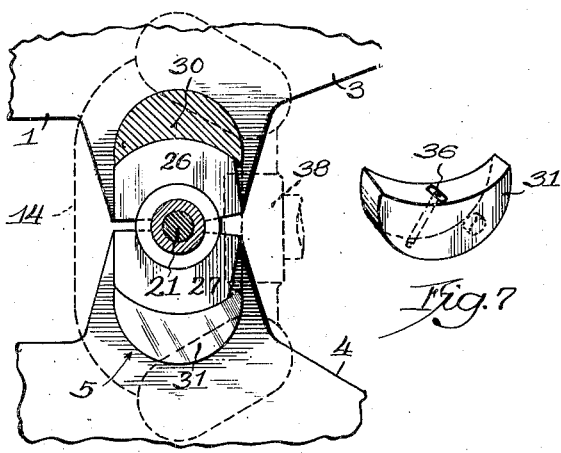
Fig. 5
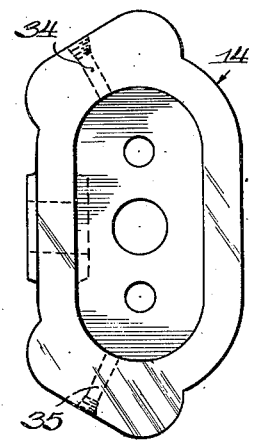
Fig. 6
Fig. 7
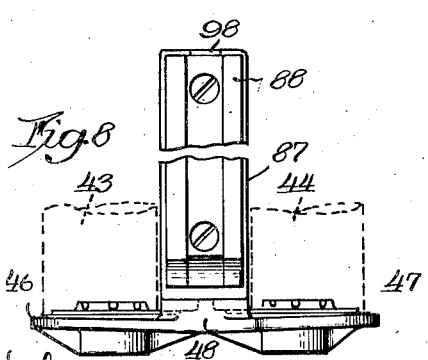
Fig. 8
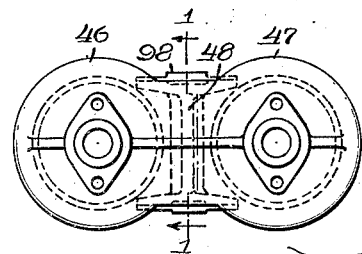
Fig. 9
Witness:
Chas. R. Koursh.
Inventor
John C. Hanna
By Wallace R. Lane, Atty.

Patented Mar. 26, 1929.

1,707,006

UNITED STATES PATENT OFFICE.

JOHN C. HANNA, OF EVANSTON, ILLINOIS, ASSIGNOR TO HANNA ENGINEERING WORKS, OF CHICAGO, ILLINOIS, A CORPORATION OF ILLINOIS.

RIVETER.

Application filed February 9, 1924. Serial No. 691,837.

The present invention relates to riveting devices of the type for operation on both ends of a rivet blank for effecting the riveting operation.

Among the objects of the invention are to provide a novel riveter having riveting jaws and power arms with a novel mounting for the pivoting, preferably in the form of a retainer having bearing portions cooperable with fulcrum or bearing portions or parts on the arms whereby the arms may be fulcrumed together, yet be capable of individual movement; to provide such retainer with replaceable members which are preferably of anti-friction composition or alloy or the like; to provide the retainer with the bearings at inner and outer points with respect to the fulcrum parts of the arms so that the outer bearings will sustain the thrust of reaction of the arms during riveting operation; to provide for transmission of power to the arms by way of anti-friction means, preferably in the form of rollers and rolling bearing elements, actuated or engaged by operating mechanism for forcibly moving the arms to effect the riveting operation at the jaw ends of the arms; to provide novel operating means having actuating members engaging the arms, more specifically the rollers on the arms, for the riveting effect, the actuating members being preferably provided with inclined actuating surfaces and in the form of wedges or the like, there being preferably surfaces of different inclinations so that the steeper surface will first act to rapidly move the arms and the more reclined surfaces to deliver the power required to effect the riveting operation, thus affording variable leverage; to provide the operating means with a cross-head to which fluid operating cylinders may be attached and movable therewith, and with the actuating member or members secured to and carried by the cross-head as the latter is moved; to provide means for suspending the device for mobility, as from a crane or the like, and also preferably having means for adjusting the level of the device and also means for manually positioning or adjusting the device to the work to be operated upon; to provide for a riveter of maximum strength with minimum weight and increased gap and capacity, as well as to reduce the overall dimensions and the proportions at the fulcruming part of the device; and, to provide for other objects, advantages and capabilities as will hereafter appear and are inherently possessed by the invention.

Figure 3:
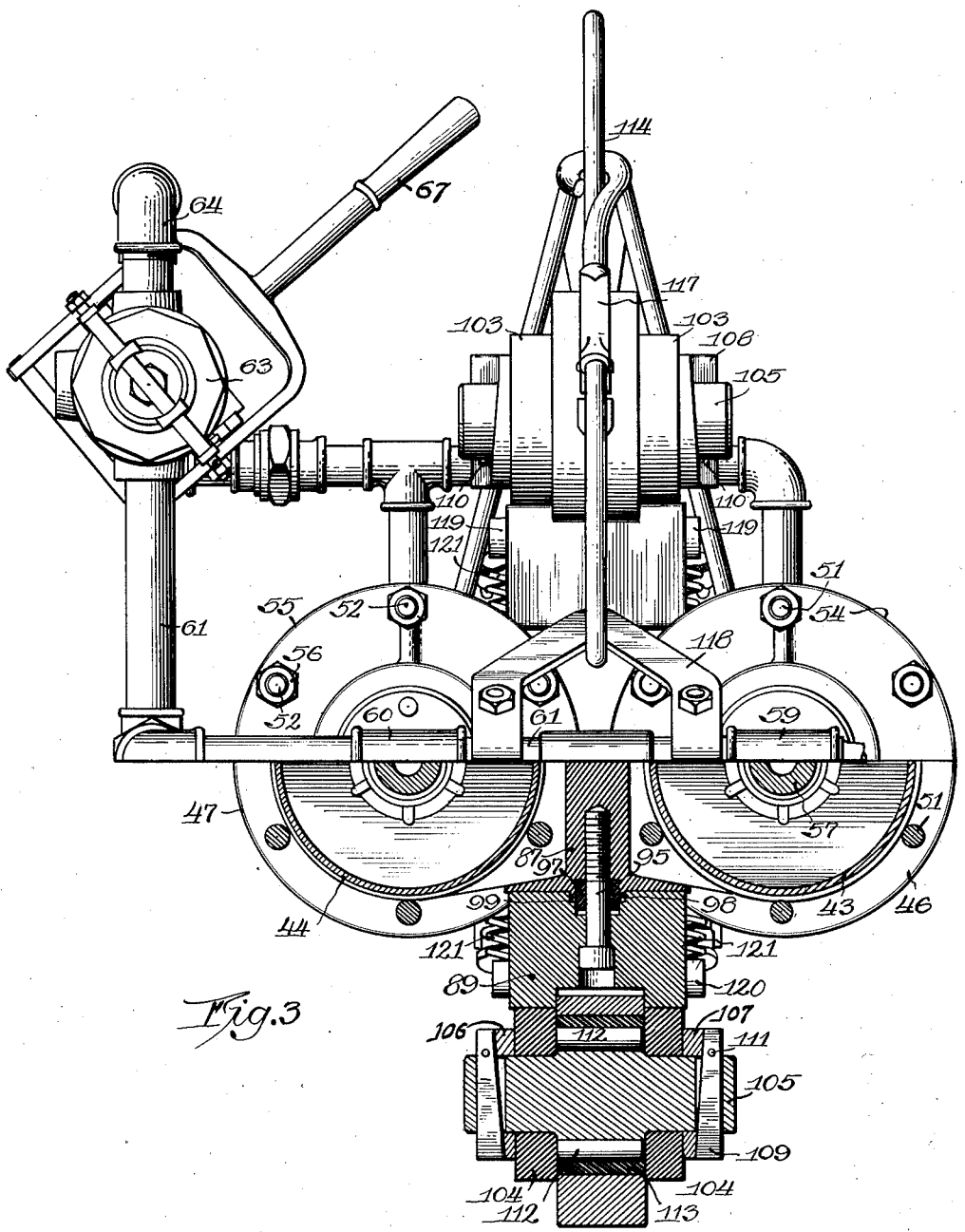

In the drawings showing a preferred embodiment of the invention, Fig. 1 is a view partly in side elevation and partly in vertical section of a riveter constructed in accordance with the invention; Fig. 2 is a part top plan and a part horizontal sectional view of the same; Fig. 3 is a rear end view, with parts in section, of the same; Fig. 4 is a vertical transverse sectional view of the fulcruming part of the invention; Fig. 5 is a part vertical sectional view and part elevational view of the fulcruming portion of the invention; Fig. 6 is a view in elevation of the fulcruming retainer; Fig. 7 is a perspective view of a bearing member of the fulcruming device; Fig. 8 is a top plan view of a part of the operating device; and, Fig. 9 is an end view of the same.

Referring more particularly to the drawings, a preferred embodiment of the invention is shown as comprising a pair of riveting jaws 1 and 2 having power arms 3 and 4 and a fulcruming device 5, together with power operating means, preferably of the steam or pneumatic type for operating the arms and jaws. The jaws are provided with inwardly directed die holding noses 6 and 7 having recesses for carrying riveting dies 8 and 9 operable in a riveting gap 10 between the noses 6 and 7. The jaws are provided with suitable passages 11 and 12 for the introduction of a bar or rod for the knocking out of the dies when desiring to replace them by dies of other sizes or by new dies when the old ones have become worn.

The fulcruming device comprises a pair of retainer members 13 and 14 of elongated or generally oval shape and disposed on opposite sides of the fulcruming parts 15 and 16 of the arms 3 and 4. The retainer members are held in place and connected together by a center bolt 17 which is threaded at its ends to receive the securing nuts 18 and 19. The center bolt has reduced diameter portions 20 and 21 carrying inner bearing members 22 and 23 formed of suitable anti-friction material or alloy such as lumen bronze or other like and similar material. The fulcruming portions 15 and 16 of the arms are formed with concaved recesses fitting about the center pin 17 and also have laterally extending trunnion portions 24, 25, 26 and 27 recessed to have bearing engagement with the enlarged portions of the bearing members 22 and 23, as clearly shown in the drawings. At the outer side of the trunnion portions 24, 25, 26 and 27 are located, within the retainer members, outer bearings 28, 29, 30 and 31 of crescent shape and of suitable bearing material such as an alloy, as lumen bronze or like and similar material, one of said bearings being shown in perspective in Fig. 7 of the drawings. Each retaining member is provided with suitable lubricating means 32 and 33 connected to suitable conduits 34 and 35 for conducting the lubricant to the outer bearing members, the latter being provided with lubricant passages 36 (see Fig. 7) whereby the lubricant may be conveyed to the bearing surfaces between the trunnion portions 24, 25, 26 and 27 and the bearing members 28, 29, 30 and 31. From this construction it will be apparent that each arm is individually oscillatable between the center or inner bearings and the respective outer bearings 28 and 29 or 30 and 31 of the arms 3 or 4, as the case may be. Moreover, when the riveting operation is being effected the thrust of reaction will be sustained by the outer bearing since the arms are being operated upon by forces tending to move them outwardly. The fulcruming portions 15 and 16 of the arms have a substantially arcuate movement in the bearings about the central axis of the central pin 17.

The retainer members are provided with laterally extending ears 37 and 38 suitably provided with threaded apertures into which are connected or secured the outer ends of hollow piston rods 39 and 40 and closure plugs 41 and 42 as clearly shown in Figs. 1 and 2 of the drawings.

The operating means for the power arms comprises a pair of cylinders 43 and 44 of the shell construction type and longitudinally slidable on pistons 45 respectively connected to the rear ends of the hollow piston rods 39 and 40. At the forward ends, the cylinders are connected to cylinder heads 46 and 47 formed integrally with an intervening member 48 so that the heads 46 and 47 and the member 48 form together a single cross-head member movable with the cylinders 43 and 44. At the other end of the cylinders are connected plates 49 and 50, the latter as well as the heads 46 and 47 being suitably provided with shoulders with which the ends of the cylinders 43 and 44 engage. The plates 49 and 50 are respectively connected to the heads 46 and 47 by tie rods 51 and 52, the rods being threaded in the plates 49 and 50 and extending through suitable apertures formed in the heads 46 and 47 and threaded at the ends of the rods to receive the securing nuts 53. At the rear end of the cylinders are connected heads 54 and 55 suitably provided with apertures to receive the threaded rear ends of the tie rods 51 and 52 to which are secured nuts 56 for holding the heads 54 and 55 in place, against the plates 49 and 50. The latter cooperate with suitable shoulders formed on the plates 49 and 50 in order to have a tight joint. By this construction the heads 54 and 55 may be removed to give access to the pistons for repacking without the necessity of dismantling the whole structure of the cylinders or operating mechanism. Secured to and extending rearwardly from each piston is a hollow piston rod 57 and 58 extending through the heads 54 and 55 whereby the latter may slide along the rods 57 and 58, and the rear ends of the latter are connected by suitable pipe fittings 59 and 60 which are in turn connected to an intermediate pipe 61. The pipe fitting 60 connects with a pipe 62 leading to a control valve of suitable construction for admitting or exhausting fluid, such as compressed air, steam, or the like when operating the operating mechanism. From the valve mechanism 63 leads another pipe or conduit 64 to the forward end of the operating mechanism where it is connected to a cross pipe 65 having connection with the forward ends of the hollow rods 39 and 40. In the arm 3 may be provided an aperture 66 through which the cross pipe 65 may pass, the aperture 66 being of sufficient size to prevent interference between the pipe and the arm 3 when it is moved during the riveting operation. The valve mechanism comprises a hand operated handle suitably connected with the valve mechanism so as to operate the same for admitting the motive fluid to either end of the piston mechanism to operate the cylinders in either one or the other direction. It will be noted that the inner ends of the piston rods 39, 40, 57 and 58 are provided with laterally directed apertures or ports 68 and 69 for the entry of the motive fluid into the interior of the cylinder space on either side of the piston.

Each piston is double-acting and is provided on opposite sides of the rod with bosses 70 and 71 to which the inner ends of the piston rods are secured by cross-pins 72 and 73 driven laterally through suitable apertures formed in the bosses and the inner ends of the hollow piston rods. Each side of the piston is formed to receive cupped packings 74 and 75 held in place by followers 76 and 77 secured to the pistons by suitable screws 78 and 79, there being also spring rings 80 and 81 interposed between the follower and the packing for holding the same in position.

The heads 46, 47, 54 and 55 are also provided with suitable packing 82 and 83 for the piston rods, such packing being held in position by gland nuts 84 and 85 threaded into the gland boxes formed in each head. Within the piston heads and between the inner ends of the piston rods is connected a threaded member 86 acting as a plug between the piston and the inner ends of the piston rods as well as means for holding the inner ends of the piston rods in proper place. It will be noted that the pistons and piston rods are relatively stationary, and the cylinders together with the cylinder heads and the cross-head are movable longitudinally along the hollow piston rods in either direction or with double action. Attached to the cross-head and to the intermediate portion 48 thereof is a rearwardly extending compression member 87 of generally I-shape in cross-section and disposed in the space between the cylinders 43 and 44 and also between the arms 3 and 4. This compression member 87 is movable with the cross-head and the cylinders and is designed to carry a pair of operating members or wedges 88 and 89 which have inclined portions 90, 91, 92 and 93 of different pitches or inclinations for engagement with or cooperation with the arms 3 and 4 so as to force the same apart during the riveting operation. The wedge members 88 and 89 are connected to the compression member 87 by screws 94 and 95 extending through suitable apertures provided in the wedges and threaded into the member 87. Both the compression member 87 and the wedges are provided with registering recesses to receive bushings 96 and 97 designed to hold the wedges in proper relation with the member 87 with respect to the longitudinal adjustment or positioning of the wedges upon said member. The screws 94 and 95 pass through the bushings as clearly shown in the drawings. The member 87 is preferably formed with ridges 98 fitting into guide grooves 99 formed in each wedge member so as to hold the latter from lateral movement with respect to the compression member 87. On the inclined portions of the wedges are provided a pair of tracks 100 and 101 between which is provided a channel 102. Both wedges are of identical construction. The tracks 100 and 101 have the two inclinations 90 and 91 and 92 and 93, as clearly shown in Fig. 1 of the drawings so that the tracks of inclined portions 90 and 92 will first engage with the power arms to give them a rapid motion and the less inclined tracks of portions 91 and 93 will act with greater power or force at the instant of heading the rivet. Such rapid movement by the greater inclined portion of the wedges is effected with very small expenditure of the motive fluid and the power effect from the less inclined parts of the wedges is obtained by the use of a greater amount of the motive fluid.

The track portions 100 and 101 of the wedges, during their longitudinal movement, engage with rolling contact with the peripheries of rollers 103 and 104 connected to a pintle 105 as clearly shown in Fig. 3 of the drawings. Each of the rollers 103 and 104 are held in place by tapered washers 106 and 107 which in turn are secured in position by wedge pins 108 and 109 driven into suitable cross apertures formed in the end portions of the pintle 105, the pins 108 and 109 being suitably held from removal by cotter pins 110 and 111. Short supplementary wedges or tapered gibs 109ª may be included in the cross apertures in cooperation with the wedge pins 109 as clearly shown in Fig. 3. The pintle 105 is rotatably mounted in a series of rolling bearing elements 112, preferably in the form of rollers, carried in a roller cage 113 supported in the rear end portions of each arm 3 or 4 as clearly shown in Figs. 1 and 3 of the drawings. The track portions 100 and 101 of the wedges engage with the rollers 103 and 104 to cause the same to rotate with the pintle 105 which in turn has rolling bearings in the arm 3 or 4. In this way the sliding engagement of the wedges with the arms is by way of antifriction mechanism so that the power may be delivered to the arms with a minimum friction.

This riveter is designed for heavy usage and while constructed as light in weight as possible to give maximum strength it is of such a weight that it is found convenient to suspend it from some suitable means such as a crane or the like in position for operation upon the work to be treated. It is therefore provided with suspending means comprising a ring 114 connected with link rods 115 and 116 respectively connected to a stud 117ª fastened to the fulcruming mechanism and to a strap 118 connected to the pipe section 61. For the purpose of adjusting the level of the device the link rod member may be provided with a turn buckle 117 which may be manually operated to correct any error in level of the device. Furthermore, in order to aid in moving the device to the point of work as well as adjusting the device to the particular point of riveting the arm 3 may be provided with a handle 118ª by which the operator may shift and adjust the device as desired to effect the placing of the jaws at the riveting location. It will, of course, be understood that the ring 114 is connected by suitable means to the device from which the riveter may be suspended. Furthermore, the arms 3 and 4 are provided with studs 119 and 120 to which is connected a coil spring 121 which is designed to return the arms 3 and 4 to normal position when the wedges are retracted to the rear and after a riveting operation. The studs 119 and 120 are preferably grooved to prevent the ends of the spring 121 from becoming readily detached.

In the operation of the device the operator moves the riveter to the work to be operated upon so that the latter will extend into the gap between the riveting dies, it being assumed that the rivet is in place ready to be headed. The operator will then operate the handle 67 of the valve mechanism 63 to shift he movable control valve therein to an end of its throw so as to control the flow of fluid, such as steam or compressed air, through the conduit 64 and into the hollow piston rods 39 and 40 so that the fluid will enter into the space between the pistons and the cylinder heads 46 and 47, it being assumed that the device has the cylinder construction in the rearward position when starting. Whatever fluids were on the other side of the pistons will be exhausted through the rods 57 and 58 to pipe 62 to the valve mechanism where it will be discharged to the atmosphere through a suitable exhaust port at the side of the valve mechanism 63. The entering fluid will then cause the operating mechanism, including the cylinder construction, to move forward and carry the wedges against the anti-friction device carried by the rear ends of the arms 3 and 4. The inclined surfaces 90 and 92 will first contact with the rollers 103 and 104 to rapidly move the arms 3 and 4 outwardly so as to quickly bring the riveting dies into engagement with the rivets. At this instant of operation the inclined surfaces 91 and 93 will then operate to apply motive force to the arms 3 and 4 so as to complete the riveting action of the dies upon the rivets. As the arms 3 and 4 are forced outwardly the thrust reaction in the fulcruming device will be sustained by the outer bearings thereof.

When the riveting action is completed, the operator then shifts the handle 67 in an opposite direction to move the valve in the mechanism to the other end of its throw so as to control the flow of fluid for admission into the pipe 62 and the piston rods 57 and 58 and thence into the spaces between the pistons and the heads 54 and 55 whereupon the cylinder device, together with the parts carried thereby will be moved rearwardly and the wedges withdrawn so that the arms 3 and 4 may be moved by the spring 121 to normal position, thus increasing the gap between the riveting dies and permitting the riveting device to be removed from the point of operation on the work. During this operation the fluids remaining in the cylinders on the opposite side of the pistons will be exhausted through the hollow piston rods 39 and 40, pipe 64 and through the exhaust port at the side of the valve mechanism 63. It will be noted that when the apparatus was first operated if any fluids were to be exhausted from between the pistons and the heads 54 and 55 that they would pass through the hollow piston rods 57 and 58, pipe 62 and to the valve mechanism 63 where the fluid would be exhausted to its exhaust port.

While I have herein described and upon the drawings shown one embodiment of the invention, it is to be understood that the invention is not limited to the particular construction, details and arrangement of parts described and shown, but that other constructions, details and arrangements of parts are comprehended by the invention without departing from the spirit thereof.

Having thus described my invention, I claim:

1. A riveter comprising a pair of aligned members, each member comprising a jaw portion, a power arm and a fulcrum portion, said fulcrum portions being aligned and provided with trunnion portions, retainer members surrounding the opposed trunnion portions of said members to retain said members in operative position, and means to separate said power arms to effect closure of said jaw portions.

2. A riveter comprising a pair of aligned members, each member comprising a jaw portion, a power arm and a fulcrum portion, said fulcrum portions being aligned and provided with trunnions flattened at each side, retainer members surrounding the opposed trunnions of said aligned members, and means to separate said power arms to effect closure of said jaw portions.

3. A riveter comprising a pair of aligned members, each member comprising a jaw portion, a power arm and a fulcrum portion, said fulcrum portions being aligned and provided with trunnions, retainer members surrounding said trunnions and bearing members interposed between said trunnions and said retainer members to receive the thrust of said trunnions under riveting action.

4. A riveter comprising a pair of aligned members, each member comprising a jaw portion, a power arm and a fulcrum portion, said fulcrum portions being aligned and provided with trunnions, a bearing member interposed between said fulcrum portions, and retainer members surrounding the aligned trunnions of said members and said bearing members.

5. A riveter comprising a pair of aligned members, each member comprising a jaw portion, a power arm and a fulcrum portion, said fulcrum portions being aligned and provided with trunnions, a bearing member interposed between said fulcrum portions, retainer members surrounding the aligned trunnions of said members and said bearing members, thrust receiving bearings interposed between said trunnions and said retainer members to receive the thrust of said trunnions under riveting action.

6. A riveter comprising a pair of aligned members, each member comprising a jaw portion, a power arm and a fulcrum portion, said fulcrum portions being aligned and provided with trunnion portions, retainer members surrounding the opposed trunnion portions of said members to retain said members in operative position, means to separate said power arms to effect closure of said jaw portions, and means to secure said retainer members together.

7. A riveter comprising a pair of aligned members, each member comprising a jaw portion, a power arm and fulcrum portion, said fulcrum portions being aligned and provided with trunnion portions, retainer members surrounding the opposed trunnion portions of said members to retain said members in operative position, and operating means attached to said retaining means and operable to separate said power arms to effect closure of said jaw portions.

8. A riveter comprising pivotally connected members, each comprising a jaw, a power arm and a fulcrum portion, a wedge-shaped separating member interposed between said power arms, and means to reciprocate said wedge-member relative to said arms, said means comprising spaced cylinders, one at each side of said wedge member and reciprocable therewith.

9. A riveter comprising pivotally connected members, each comprising a jaw, a power arm and a fulcrum portion, a wedge-shaped separating member interposed between said power arms, means to reciprocate said wedge member relative to said arms, said means comprising spaced cylinders, one at each side of said wedge member and reciprocable therewith, and stationary pistons located in said cylinders and coacting therewith.

10. A riveter comprising pivotally connected members, each comprising a jaw, a power arm and a fulcrum portion, a wedge-shaped separating member interposed between said power arms, means to reciprocate said wedge member relative to said arms, said means comprising spaced cylinders, one at each side of said wedge member and reciprocable therewith, stationary pistons located in said cylinders and coacting therewith, and stationary fluid supplying piston rods extending through said cylinders and secured to said piston.

11. A riveter comprising pivotally connected members, each comprising a jaw, a power arm and a fulcrum portion, a wedge-shaped separating member interposed between said power arms, means to reciprocate said wedge member relative to said arms, said means comprising spaced cylinders, one at each side of said wedge member and reciprocable therewith, stationary pistons located in said cylinders and coacting therewith, stationary fluid supplying piston rods extending through said cylinders and secured to said piston, said piston rods being operably attached to said members adjacent the fulcrum point thereof.

12. A riveter comprising a pair of aligned members, each member comprising a jaw portion, a power arm and a fulcrum portion, means securing said members in pivotal relation at said fulcrum portions, piston rods attached to said last named means, stationary pistons carried thereby, reciprocable cylinders mounted on said pistons, and separating means carried by said cylinders and coacting with said power arms to separate the same to effect closure of said jaw portions.

13. A riveter comprising a pair of aligned members, each member comprising a jaw portion, a power arm and a fulcrum portion, said fulcrum portions being provided with trunnions, the trunnions of one member being aligned with respect to the corresponding trunnions of the other member, a central bearing member interposed between said fulcrum portions, retaining members surrounding said trunnions, bearing elements interposed between said trunnions and said retainer members and a bolt extending through said central bearing member and said retainer members to secure the same in operative relation.

14. A riveting device comprising jaws having power arms and means for fulcruming the arms and jaws, an operating means for the arms, said operating means having a wedge member provided with an inclined track having operating portions of different inclinations, for engaging and operating against said arms, the track portion having the greater inclination operating to rapidly move the arms, and the track portion of the lesser inclination operating with slower movement and with greater force for effecting the riveting operation.

15. A riveting device comprising jaws having power arms and means for fulcruming the arms and jaws, power transmission rollers carried by said arms, an operating means for said arms, said operating means comprising a wedge member provided with roller engaging portions, said roller engaging portions having a steep inclination for effecting initial rapid movement of the arms, and a less steep inclination for the transmission of the force for effecting the riveting operation.

In witness whereof, I hereunto subscribe my name to this specification.

JOHN C. HANNA.